United States Patent [19]

Sewell et al.

[11] 4,375,383

[45] Mar. 1, 1983

[54] HIGH SPEED COLD ADHESIVE CURING PROCESS AND APPARATUS THEREFOR

[76] Inventors: Peter C. Sewell, 4490 Blenheim, Vancouver, B. C.; Gregory E. Rundle, 22 - 11491 - 7th Ave., Richmond, B. C., both of Canada

[21] Appl. No.: 255,336

[22] Filed: Apr. 17, 1981

[51] Int. Cl.[3] ................................................ B32B 7/14

[52] U.S. Cl. .................................... 156/291; 156/277; 156/308.6; 156/324.4; 156/332; 156/578; 156/580; 229/485 A; 229/485 B; 428/186; 428/198; 428/211; 493/128

[58] Field of Search ............... 156/277, 332, 291, 578, 156/308.6, 580, 324.4; 428/186, 211, 198; 493/128; 229/485 A, 485 B

[56] References Cited

U.S. PATENT DOCUMENTS

| | | | |
|---|---|---|---|
| Re. 27,631 | 5/1973 | Berney | 493/128 |
| 1,974,256 | 9/1934 | Bergstein | 493/128 |
| 2,145,334 | 1/1939 | Bergstein | 156/291 |
| 2,575,558 | 11/1951 | Newey et al. | 156/330 |
| 2,984,598 | 5/1961 | Gobalet | 156/322 |
| 3,140,215 | 7/1964 | Russell | 493/128 |
| 3,594,210 | 7/1971 | Frelich | 428/211 |
| 3,664,901 | 5/1972 | Young | 156/580 |
| 4,004,049 | 1/1977 | Horwat et al. | 156/291 |

*Primary Examiner*—John J. Gallagher
*Attorney, Agent, or Firm*—Lane, Aitken, Kice & Kananen

[57] ABSTRACT

This invention is directed to a high speed cold adhesive curing process and apparatus therefor, useful in the assembly and fastening together of fibrous surfaces such as the surfaces of corrugated Kraft paper cardboard boxes. The invention is directed to a process for adhering two fibrous surfaces together by means of a liquid cold cure adhesive comprising: (a) spraying liquid cold cure adhesive on the interface surface of one of the fibrous surfaces in a thin discrete particle pattern; and (b) pressing the two fibrous surfaces together under high pressure sufficient to cause the solvent carrier in the cold cure adhesive to disperse into the interstices of the fibres of the two surfaces, thereby enabling the cold cure adhesive particles to rapidly secure the two surfaces together.

6 Claims, 4 Drawing Figures

HIGH SPEED COLD ADHESIVE CURING PROCESS AND APPARATUS THEREFOR

FIELD OF THE INVENTION

This invention is directed to a high speed liquid cold adhesive curing process and apparatus therefor, useful in the assembly and fastening together of two fibrous surfaces such as the surfaces of corrugated Kraft paper cardboard boxes.

BACKGROUND OF THE INVENTION

At present, there is not available on the commercial marketplace an acceptable process and apparatus for erecting corrugated cardboard box flats and gluing the flaps together using a liquid cold adhesive. Such boxes are used as cases for packaging various articles such as cans and the like. The reason for this absence is simple—it takes 4 to 6 seconds using conventional case erecting and gluing systems for a cold adhesive to reach a cure stage that causes the glued components of the box to adhere together to a point where subsequent operations can be done to the case. Most commercial box or case construction lines run at a rate of 20 to 30 boxes per minute and consequently, the 4 to 6 second cure time is not economically viable. The assembly line has to be unduly and uneconomically long in order to provide the 4 to 6 second adhesion time before the box or case can be filled or used.

Cold cure adhesives have also been generally disfavoured because it has been believed that such adhesives cannot be applied to a surface, set and dried, and then subsequently used in adhesive applications by rewetting the dried adhesive. The adhesive strength obtained in such applications has generally been found to be unsatisfactory.

Because of the slow cure time required for liquid cold adhesive systems, the preferred practice in corrugated box or case construction has been to use a hot melt adhesive. Hot melt adhesives have the advantage that they have a relatively rapid adhesive cure time. Unfortunately, however, these adhesives have a number of serious shortcomings.

They generally cost about two times more than cold cure adhesives. Furthermore, the equipment required to spray and apply hot melt adhesives costs about five times the cost of cold cure adhesive application equipment.

A second serious disadvantage is that hot melt adhesives have considerably lower adhesive strength than cold cure adhesives. Hot melt adhesives are relatively viscous and this detracts from the ability of the hot melt adhesive to be spread in a thin discrete particulated pattern which is required to provide a strong adhesive bond. Further, the high viscosity inhibits the hot melt adhesive penetrating the fibres of the corrugated cardboard and forming a strong bond.

A third major disadvantage with hot melt adhesives is that they tend to be brittle at cold temperatures, and hence boxes or cases using hot melt adhesives are not useful in freezer environments or in winter packaging applications.

In view of the foregoing, it can be readily understood that there is a strong need in the marketplace for a rapid cure cold melt adhesive system that can be used for gluing corrugated boxes or cases together from corrugated cardboard blanks.

SUMMARY OF THE INVENTION

We have invented a process and an apparatus whereby liquid cold cure adhesives can be used in the rapid adhering together of fibrous surfaces such as takes place in the erection and construction of corrugated cardboard boxes and cases from corrugated cardboard flats. Useful adhesion set time using our process and apparatus is in the order of virtually instantaneous to 1½ seconds, depending upon process variables such as temperature, pressure, type of corrugated cardboard being used, and the like. Since the cold adhesive cure time is of very short duration, our apparatus and process can be used in conventional hot melt adhesive box erection and gluing lines. A significant advantage of our cold adhesive cure process and apparatus is that the overall cost of the system is about one fifth of the cost of a typical hot melt adhesive system.

The cold adhesive used in our process and apparatus is sprayed or broadcast upon the corrugated cardboard in atomized form, using adhesive spray nozzles. A thin, spread-out, dotted or atomized pattern of cold adhesive over the surface of the corrugated cardboard to be glued, is believed to be a requirement for satisfactory performance of the system under the process conditions and apparatus of our invention.

The invention is directed to a process for adhering two fibrous surfaces together by means of a fluid cold cure adhesive comprising: (a) spraying cold cure adhesive on the interface surface of one of the fibrous surfaces in a thin discrete particle pattern; and (b) pressing the two fibrous surfaces together under high pressure sufficient to cause the solvent carrier in the cold cure adhesive to disperse into the interstices of the fibres of the two surfaces, thereby enabling the cold cure adhesive particles to rapidly secure the two surfaces together.

The pressure applied can be in a range of about 20–160 lbs. per sq. inch. The cold cure adhesive may be a polyvinyl acetate resin emulsion. The fibrous surfaces being adhered together are the interface surfaces of two pieces of corrugated cardboard. The duration of the compression can usefully be about 1.0 to 2.0 seconds.

The system also includes cold cure adhesive applications where the adhesive has been applied to a fibrous surface, allowed to set and dry, and is then rewetted at some later suitable time. It has been discovered that satisfactory adhesive strengths can be obtained using our system and apparatus on rewetted surfaces having previously applied and dried cold cure adhesive thereon.

The apparatus that may be used for rapidly adhering together the interface surfaces of two fibrous materials by the application of high pressure using a fluid cold cure adhesive system comprises: (a) means for first applying a thin discrete pattern of cold cure adhesive particles on at least one of the interface surfaces of the fibrous materials to be adhered together; and (b) means for then juxtapositioning the two surfaces together and applying high pressure to the two exterior surfaces of the two materials to cause high pressure to occur at the adhesive interface of the two materials.

In the apparatus, the means for applying pressure to one of the exterior surfaces of the two materials may be a plate which contacts in parallel the exterior face of one of the two fibrous surfaces, thereby forcing it at high pressure and velocity to juxtaposition with the second fibrous surface. For energy saving purposes, and more efficient operation, the high pressure may be applied to the plate after the two surfaces have already been juxtapositioned together. For example, a pneumatically driven hammer may be used to apply the high pressure to the plate.

DRAWINGS

DETAILED DESCRIPTION OF AND EMBODIMENT OF THE INVENTION

Figure 2:
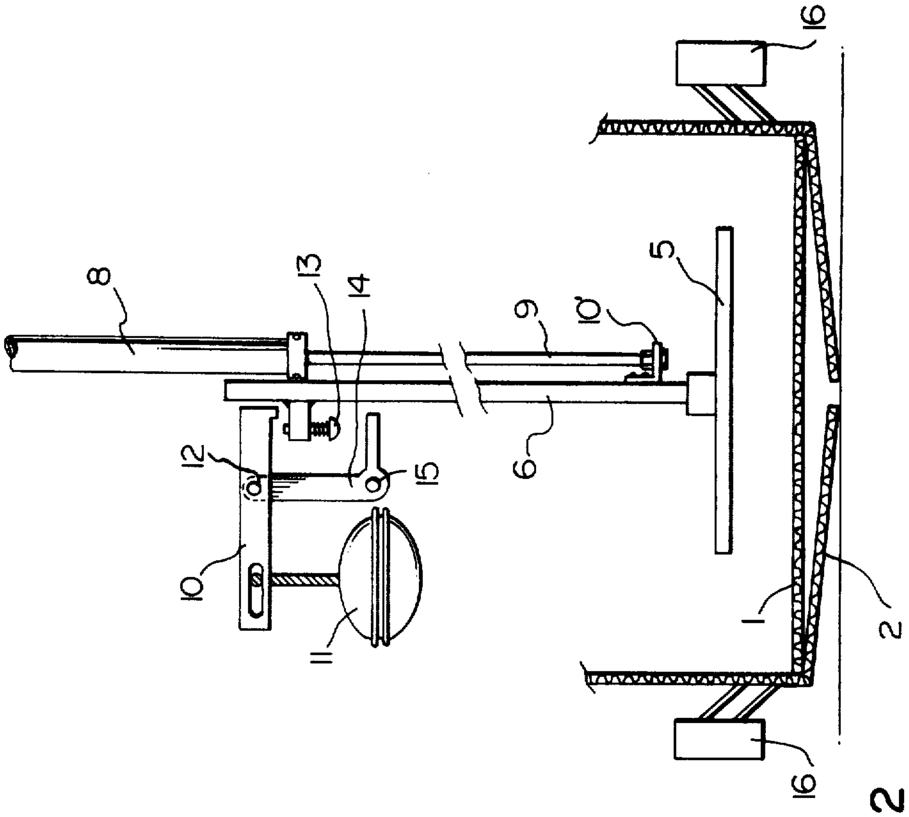
FIG. 2 represents a side elevation view of a corrugated cardboard piece (such as a case or box) and an underlying corrugated cardboard piece (such as the flaps of the box) prior to being pressed together by means of a pressure applicator (platen).

We have discovered in the development of corrugated box sealing equipment that two pieces of corrugated cardboard with small atomized particles of cold cure adhesive broadcast thinly and discretely on the interface surfaces of one or both of the pieces of corrugated cardboard can be rapidly set in a matter of 0.25 to 1.5 seconds by the application of high external pressure to the two outer faces of the two pieces of cardboard, thereby forcing the adhesive interface together.

We have devised a mechanical system which takes advantage of this discovery and put it to practical use. The system is basically designed for gluing together the flaps of boxes, cartons or cases erected from flats and used as packaging for articles such as cans, bottles, and the like. The system compresses the bottom of a partially assembled corrugated cardboard box, including the flaps, tightly together by using a primary compression plate system with a secondary booster system.

While various mechanical systems can probably be developed and used to practice the discovery, the key to the invention is the discovery and recognition of the fact that it is possible to adhere two pieces of pressed fibrous material such as corrugated cardboard together using a cold cure adhesive, in a matter of only 0.25 to 1.5 seconds by using a combination of high pressure, and a thinly spread atomized pattern of adhesive discretely broadcast over one or both of the interface surfaces of that are to be glued together in a parallel manner. While a pressure within a broad range of pressures may suffice, we have found that pressure in the range of 20 to 160 lbs. per sq. inch has given good results.

In most corrugated box carton or case assembly lines, the items in erected form are in the order of 10–30 inches in depth. Furthermore, the boxes, cases or cartons are travelling along the line at a rate of 20 to 40 boxes per minute. These rates allow only short duration, manipulation times for each box ranging from 1½ to 3 seconds. Thus, in order to accomplish an operation such as sealing the bottom flaps of each box, it is necessary for the high pressure applicator to descend rapidly into the interior of the box for a distance of at least 10 to 30 inches to a position proximate to the bottom of the box and then, at the end of the stroke, apply 20 to 160 lbs. pressure per sq. inch to the bottom of the box. The pressure applied will vary according to process conditions and requirements. These conditions present a difficult operation problem because the pressure applicator not only has to travel at substantial speeds, but it must be heavy and strong enough (which creates an unwanted high inertia coefficient) to generate a substantial force at the end of each stroke.

To deal with these problems, and to reduce weight in the high speed pressure applicator, we have invented a secondary booster system which operates in the following manner. After the lightweight pressure applicator descends rapidly into the interior of the corrugated box 10 to 30 inches as required, a secondary presure booster system comes into play and applies 20 to 160 lbs. per sq. of pressure for the last ⅛ inch stroke of the pressure applicator. This system is described in more detail below in association with the accompanying drawings.

Figure 1:
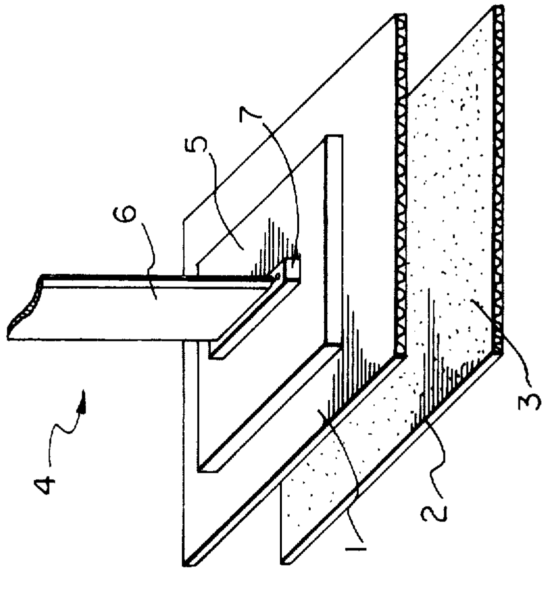
FIG. 1 represents a perspective view of a lower horizontal corrugated cardboard piece, with a cold cure adhesive pattern sprayed thereon, and a superimposed horizontal corrugated cardboard piece with a high pressure applicator positioned on the top surface of the superimposed cardboard piece.

Referring to FIG. 1, it can be seen that two parallel horizontal pieces of cardboard 1 and 2 are separated from one another. An atomized dot-like pattern of discrete particles of liquid or emulsified cold cure adhesive 3 has been applied over the top surface of the bottom piece of corrugated cardboard 2. The adhesive can be applied by any suitable cold cure adhesive application nozzle. However, it is highly important that the adhesive is sprayed over the surface in a thin pattern of tiny discrete cold cure adhesive particles, and not as large drops or globules of adhesive. If required, or desirable, adhesive can also be sprayed on the under surface of the top piece 1.

Positioned above the upper piece of corrugated cardboard 1 is a pressure applicator 4. This applicator 4 consists of a horizontal broad flat compression platen 5 constructed of steel, or other strong suitable material. The platen 5 is controlled by a vertical ram bar 6, which travels upwardly or downwardly through a vertical stroke, as required. The platen 5 is reinforced by a support 7 at the point where it meets the ram bar 6.

Figure 3:
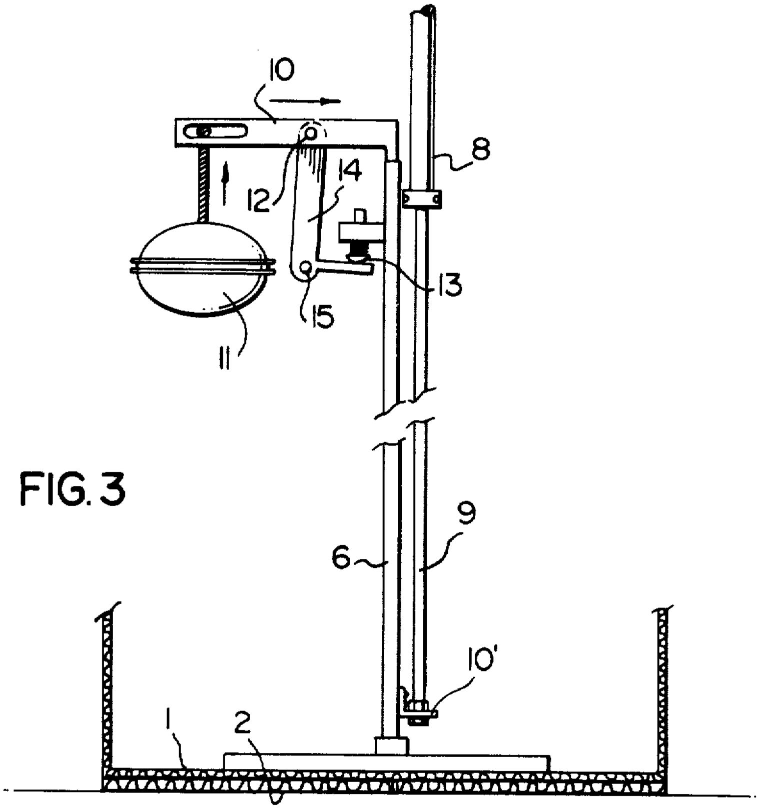
FIG. 3 represents a side elevation view of the corrugated cardboard pieces illustrated in FIG. 2 pressed together by the pressure applicator.

FIG. 2 depicts, in side elevation view, the position of the applicator 4 before it descends to the bottom of its travel to press cardboard pieces 1 and 2 together in parallel fashion. The upward and downward movement and travel of bar 6 is controlled by an air cylinder 8, which operates at 60 to 100 lbs. per sq. inch pressure, and extends a rod 9 from an upper position as shown in FIG. 2, to a lower position as shown in FIG. 3. The rod 9 is connected to bar 6 by attachment 10'. The air cylinder 8 is capable of moving the platen 5 from its top position (as shown in FIG. 2) to its bottom position, and in reverse, in rapid succession. This action enables the platen 5 to be moved upwardly and downwardly into and out of the interiors of corrugated cardboard boxes that are travelling along lines that erect and assemble 20 to 30 boxes per minute.

The final pressure in the order of 20 to 160 lbs. per sq. inch, over the last ⅛ inch of travel of the applicator 4, is provided by a high compression hammer 10 and high compression booster cylinder 11 combination. When the two pieces of corrugated cardboard 1 and 2 (such as the major and minor flaps of an erected case) meet one another at the region of the bottom of the stroke of the applicator 4 (as seen in FIG. 3), a booster force is applied to the top of the ram bar 6 by hammer 10 which is activated by a booster cylinder 11. The booster hammer 10 pivots about a horizontal pivot 12 or similar device. The cylinder 11 automatically becomes activated at the bottom of the stroke of the pressure applicator 4 by means of a ram bar hammer advance knob 13 contacting advance crank 14 (see FIG. 3) to provide a strong, solid force generating in the order of 20 to 160 lbs. per sq. inch, to the top of bar 6. The action of the hammer 10 on the top of bar 6 causes the applicator 4 to travel approximately ⅛ inch further at the bottom of its stroke, thereby firmly pressing cardboard pieces 1 and 2 and the discrete interface of cold cure adhesive together. The booster pressure can typically be of ½ to 2 seconds duration, or longer or shorter, as required to meet process requirements.

As can be seen in FIG. 3, the hammer 10 at the bottom of the stroke, by means of contact of the knob 13 with crank 14, rotates slightly to the right about pivot 15 so that its right end is over bar 6. While it is not shown, air cylinder 8, air cylinder 11 and pivot 15 are secured to a frame for solid support. The sides of this case can be held down by a suitable hold down mechanism such as mechanical flap clutching fingers, side clamps, or transit bars 16, as shown.

We have found that a liquid polyvinyl acetate cold cure resin adhesive system is satisfactory for purposes of this invention. Maximum adhesion strength, following initial adhesion, is obtained within the next 5 to 10 seconds. The adhesion provided by a liquid cold cure adhesive is substantially superior to a hot melt adhesive system and, unlike a hot melt adhesive system, is so strong upon ultimate cure that the cardboard itself will part, before the adhesive will part.

A distinct advantage of the secondary high pressure booster step is that it saves energy and cuts down on equipment costs by eliminating heavy equipment capable of applying and transmitting high pressure throughout the entire operation cycle. High pressure is applied only at the last critical portion of the stroke cycle of the pressure applicator 4, and thus enables a lighter construction of apparatus to be used.

A compressed air system is believed to be the preferred system for driving the various components of the apparatus. A hydraulic oil system is not satisfactory for line speeds as described because such a system is too slow. Furthermore, air is clean whereas oil tends to leak from time to time and provides a hygiene problem which is not accepted in many packaging environments such as food packaging.

Results of Adhesion Testing Using Paper Materials and Cold Set Adhesives

Figure 4:
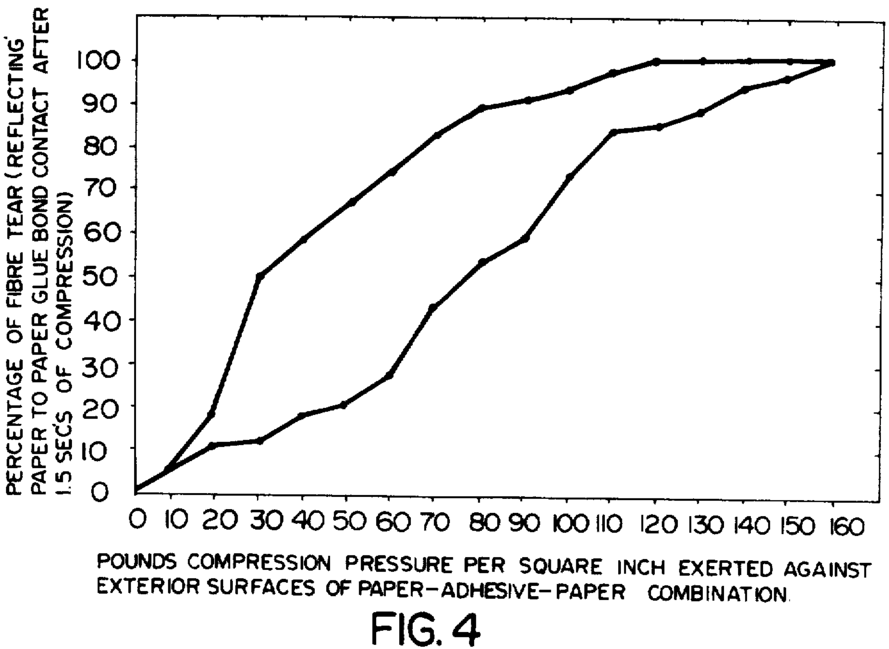
FIG. 4 represents a graphical depiction of the relationship between percentage of fibre tear and compression exerted on a paper-adhesive-paper interface.

Referring to FIG. 4, which depicts in graphical manner the behavioural characteristics of cold cure adhesive sprayed onto the interface of two sheets of paper, the upper line displays the amount of fibre tear using a light dense spray of adhesive droplets, while the lower line displays the amount of fibre tear using a heavy atomised adhesive spray of droplets.

The adhesive used in the tests giving rise to the graphical data depicted in FIG. 4 is available under the trade mark RESYN 33-1583 (formerly 72-1142) and has the following characteristics:

Product Type: Formulated emulsion cold cure adhesive.

Physical Properties:

Appearance: Fluid, white product
Viscosity: Approx. 2500 mPa.s (cP)

Solids: Approx. 56%
pH: Approx. 4.5
Relative Density: Approx. 1.08 (10.8 lbs/Imp Gal)

Meets composition requirements of U.S. F.D.A. Regulation 121.2520 "Adhesives".

Time Factor

The graph is based on 1.5 seconds of compression time. Beyond this point in time further compression does not appear to influence adhesive droplet penetration. Therefore, adhesive curing time starts no later than 1.5 seconds.

Fibre Tear Factor vs. Time

Fibre tear testing was calculated 1.0 second after 1.5 seconds of compression time. The graph displays the correct percentage of fibre tear for 1.5 seconds of compression.

The compression times below reflect a percentage loss of fibre tear 1.0 second after compression.

1.0 sec. compression—8% reduction in fibre tear
0.5 sec. compression—12% reduction in fibre tear
0.25 sec. compression—25% reduction in fibre tear According to tests, 100% fibre tear is achieved in tests below 160 lbs. pressure, to as low as 20 lbs. pressure. This only occurs seconds after compression, for example:

1.5 seconds of 20 lbs. to 160 lbs. pressure yields 100% fibre tear after 3.0 secs.
1.0 second of 20 lbs. to 160 lbs. pressure yields 100% fibre tear after 4.0 secs.
0.5 second of 20 lbs. to 160 lbs. pressure yields 100% fibre tear after 4.0 secs.
0.25 second of 20 lbs. to 160 lbs. pressure yields 100% fibre tear after 7.0 secs.

These results, even at the 0.25 second time, demonstrate an initial and secondary fibre tear result that can have very viable, practical applications in corrugated and related paper industries.

Reactivation of Dried Adhesive

Reactivation of dried adhesive using forms of water application has also been found to result in usable bonding when subjected to high compression techniques according to the invention.

As will be apparent to those skilled in the art in the light of the foregoing disclosure, many alterations and modifications are possible in the practice of this invention without departing from the spirit of scope thereof. Accordingly, the scope of the invention is to be construed in accordance with the substance defined by the following claims.

The embodiments of the invention in which an exclusive property or privilege is claimed are defined as follows:

1. A process for rapidly adhering two fibrous surfaces together in a case erecting and sealing process by means of a liquid cold cure adhesive comprising:

(a) spraying liquid cold cure adhesive on the interface surface of at least one of the fibrous surfaces in a thin discrete particle pattern;

(b) pressing the two fibrous surfaces together under high pressure sufficient to cause the solvent carrier in the cold cure adhesive to disperse into the interstices of the fibres of the two surfaces and curing the cold cure adhesive in the absence of heat, thereby enabling the cold cure adhesive particles to rapidly secure the two surfaces together.

2. A process according to claim 1 wherein the pressure applied is in a range of about 20–160 lbs. per sq. inch.

3. A process according to claim 1 wherein the cold cure adhesive is a polyvinyl acetate resin.

4. A process according to claim 1, 2 or 3 wherein the duration of the applied pressure is 0.25 to 2.0 seconds.

5. A process according to claim 1, 2 or 3 wherein the fibrous surfaces being adhered together are the interface surfaces of two pieces of corrugated cardboard.

6. A process according to claim 1, 2 or 3 wherein the adhesive is set and dried and then rewetted before pressure is applied to the two fibrous surfaces.

* * * * *